United States Patent
Banta, III et al.

(10) Patent No.: US 7,077,784 B2
(45) Date of Patent: Jul. 18, 2006

(54) SYSTEM FOR CONTROLLING ENGINE CRANKSHAFT DECELERATION BY LIMITING ENGINE RETARDING TORQUE

(75) Inventors: George L. Banta, III, Columbus, IN (US); Robert J. Layman, Columbus, IN (US); Martin T. Books, Columbus, IN (US); Greg A. Moore, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 176 days.

(21) Appl. No.: 10/758,498

(22) Filed: Jan. 15, 2004

(65) Prior Publication Data
US 2005/0159271 A1    Jul. 21, 2005

(51) Int. Cl.
*B60W 10/04* (2006.01)

(52) U.S. Cl. ........................ 477/107; 477/110
(58) Field of Classification Search .......... 477/107, 477/110
See application file for complete search history.

(56) References Cited

U.S. PATENT DOCUMENTS

| 4,321,896 | A | | 3/1982 | Kasting |
| 5,290,207 | A | | 3/1994 | Yamamoto et al. |
| 5,588,325 | A | | 12/1996 | Green et al. |
| 5,910,069 | A | * | 6/1999 | Markyvech ............. 477/109 |
| 5,921,883 | A | * | 7/1999 | Bellinger ............. 477/33 |
| 6,267,705 | B1 | | 7/2001 | Rose et al. |
| RE38,615 | E | * | 10/2004 | Dresden et al. ......... 74/336 R |

FOREIGN PATENT DOCUMENTS

| JP | 59220440 | | 5/1983 |
| JP | 8-80768 | * | 3/1996 |

* cited by examiner

*Primary Examiner*—Ha Ho
(74) *Attorney, Agent, or Firm*—Barnes & Thornburg LLP (57) ABSTRACT

A system for controlling engine crankshaft deceleration in an internal combustion engine is operable to determine whether the engine is operating with low inertia, to monitor an operational status of an engine retarding device configured to produce an engine retarding torque for decreasing rotational speed of the engine crankshaft, and to limit the retarding torque produced by the engine retarding device if the engine retarding device is operational and if the engine is operating with low inertia.

20 Claims, 4 Drawing Sheets

SYSTEM FOR CONTROLLING ENGINE CRANKSHAFT DECELERATION BY LIMITING ENGINE RETARDING TORQUE

FIELD OF THE INVENTION

The present invention relates generally to systems for controlling crankshaft deceleration in an internal combustion engine, and more specifically to systems operable to control engine crankshaft deceleration by limiting the retarding torque produced or applied by an engine torque retarding device.

BACKGROUND OF THE INVENTION

Accessory drive systems for internal combustion engines typically include rotatable components, such as a fan and/or other high rotational inertia components, which are driven by the engine via a pulley and flexible belt arrangement, hydraulic pump, chain drive, or the like. In one such system, a crankshaft pulley is rotatably driven by the engine crankshaft, and a rotatable component, such as a fan hub rotor of a fan assembly, is driven by an accessory pulley, and the crankshaft pulley drives the accessory pulley via a flexible belt rotatably connected therebetween.

In order to maintain appropriate belt tension over time and over a wide range of operating conditions, accessory drive systems of the foregoing type may include a belt tensioner that is typically provided in the form of a pulley or wheel that exerts a biasing force on the belt to maintain a desired belt tension. It is desirable with such accessory drive systems to control operation of the engine so as to avoid belt tensioner instability conditions, such as excessive accumulation of the belt in the region between rotating components, typically referred to as a span, resulting in the tensioner rotating through its full travel, which may cause the maximum load capacity of the belt tensioner to eventually be exceeded.

SUMMARY OF THE INVENTION

The present invention may comprise one or more of the following features and combinations thereof. A system for controlling deceleration of an engine crankshaft in an internal combustion engine may comprise at least one sensor producing a sensor signal indicative of an operational condition of the engine, an engine retarding device configured to produce a retarding torque for decreasing rotational speed of the engine crankshaft, and a control computer processing the sensor signal produced by the at least one sensor to determine whether the engine is operating with low inertia, the control computer controlling deceleration of the engine crankshaft when the engine retarding device is operational by limiting the retarding torque produced by the engine retarding device.

A method for controlling engine crankshaft deceleration in an internal combustion engine may comprise the steps of determining whether the engine is operating with low inertia, monitoring an operational status of an engine retarding device configured to produce a retarding torque for decreasing rotational speed of the engine crankshaft, and limiting the retarding torque produced by the engine retarder device if the engine retarding device is operational and if the engine is operating with low inertia.

These and other objects of the present invention will become more apparent from the following description of the illustrative embodiments.

DESCRIPTION OF THE ILLUSTRATIVE EMBODIMENTS

For the purpose of promoting an understanding of the principles of this disclosure, reference will now be made to one or more embodiments illustrated in the drawings and specific language will be used to describe the same. It will nevertheless be understood that no limitation of the scope of the disclosure is thereby intended.

Figure 1:
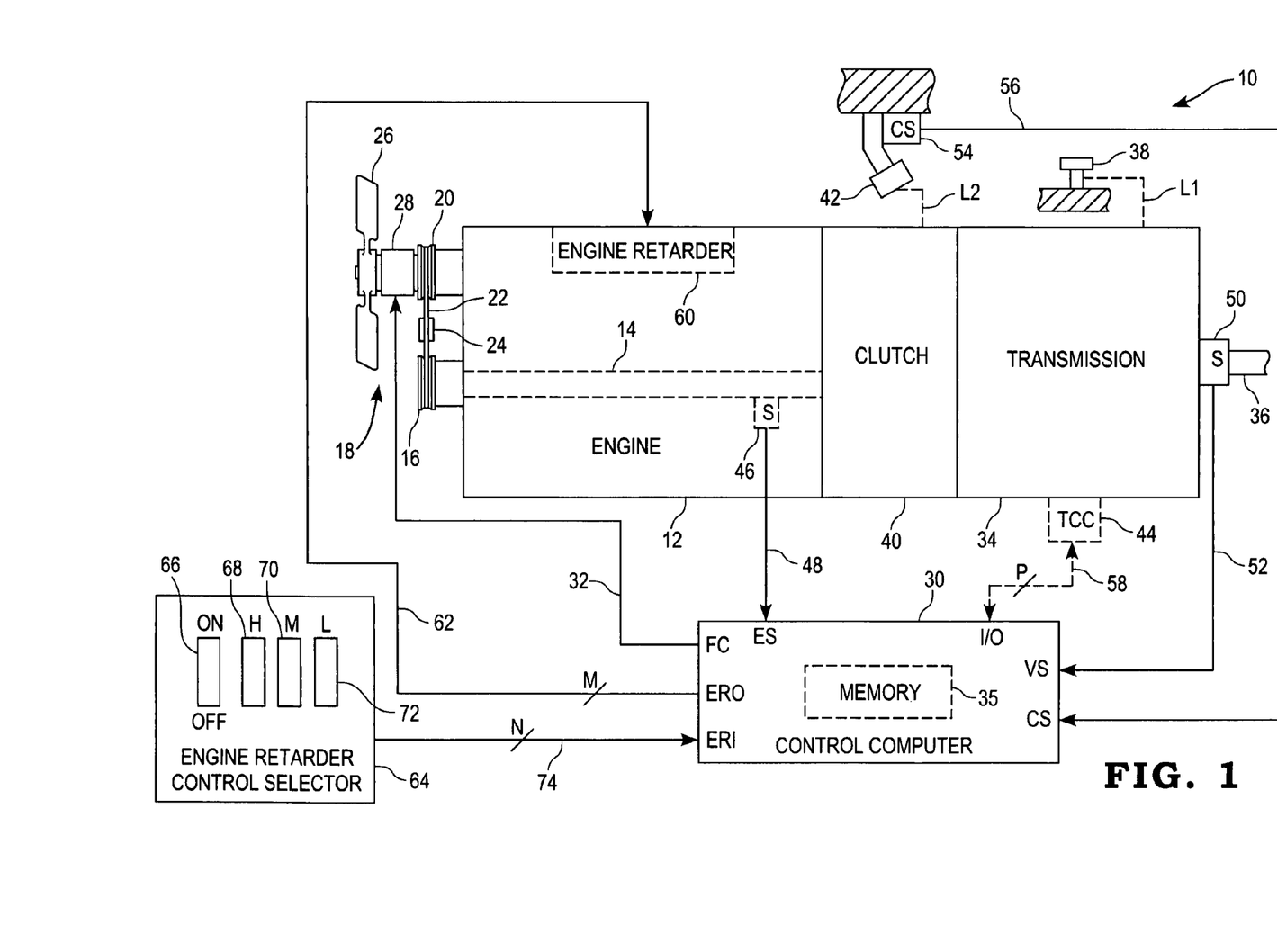
FIG. 1 is a block diagram of one illustrative embodiment of a system for controlling engine crankshaft deceleration by limiting engine retarding torque.

Referring now to FIG. 1, a diagram of one illustrative embodiment of a system 10 for controlling engine crankshaft deceleration by limiting engine retarding torque is shown. System 10 includes an internal combustion engine 12 having a rotatable crankshaft 14, wherein the engine is operable in a known manner to rotationally drive the crankshaft 14 via combustion of an air-fuel mixture. The crankshaft 14 is mechanically coupled at one end of engine 12 to a crankshaft pulley 16 forming part of an engine cooling fan assembly 18 of known construction, wherein the crankshaft pulley 16 is mechanically coupled to a fan pulley 20 via a flexible fan belt 22. A fan belt tensioner 24 maintains the tension on the fan belt 22 at or near a target tension value. The fan pulley 20 is coupled to a fan hub rotor of the engine cooling fan 26 via an electronically and/or pneumatically controlled fan clutch 28. The fan clutch 28 includes a signal input electrically or pneumatically connected to a fan clutch output, FC, of a control computer 30 via signal path 32, and control computer 30 is operable to control operation of the engine cooling fan 26 by controlling the fan clutch signal on signal path 32 in a known manner to selectively couple the fan pulley 20 to the fan hub rotor of the engine cooling fan 26.

The control computer 30 is generally operable to control and manage the overall operation of engine 12, and includes a memory unit 35 as well as a number of inputs and outputs for interfacing with various sensors and systems coupled to engine 12. Control computer 30 is, in one illustrative embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 30 includes one or more control algorithms, as will be described in greater detail hereinafter, for controlling engine crankshaft deceleration by limiting engine retarding torque.

System 10 further includes a transmission 34 operatively coupled to the engine 12, wherein engine crankshaft 14 is configured to drive the transmission 34 in a known manner, and transmission 34 is, in turn, operable to rotatably drive a tailshaft or propeller shaft 36 coupled thereto. Tailshaft 36 is mechanically coupled to the wheels of a vehicle carrying the engine 12 (not shown) in a known manner, wherein rotation of the tailshaft is translated to one or more of the vehicle wheels via a differential and axle combination to drive the vehicle. In the embodiment illustrated in FIG. 1, transmission 34 includes a number of manually selectable gear ratios, and further includes a gear shift lever 38 mechanically coupled to transmission 34 via mechanical linkage L1. Manual shifting between the number of manually selectable gear ratios of transmission 34 is accomplished in a known manner via user manipulation of the gear shift lever 38. In embodiments of transmission 34 including at least one manually selectable gear ratio, system 10 includes a clutch 40 coupling the engine 12 to the transmission 34. In such embodiments, system 10 includes a clutch pedal 42 coupled to the clutch 40 via a mechanical linkage L2, wherein the clutch pedal is manipulated by a driver of the vehicle to engage/disengage the engine 12 to/from the transmission 34 as is known in the art.

Transmission 34 may additionally include one or more automatically selectable gear ratios, and in one such embodiment transmission 34 includes a transmission control computer 44, as shown in phantom in FIG. 1. Transmission control computer 44 is electrically connected to an input/output port, I/O, of control computer 30 via a number, P, of signal paths 58, wherein P may be any positive integer. Signal paths 58 may be, for example, a known serial data communications link, and in one embodiment signal paths 58 form a known Society of Automotive Engineers (SAE) J1939 data link. In this embodiment, control computer 30 and transmission control computer 44 are each configured for serial communications therebetween on data link 58 in accordance with SAE J1939 communications protocol. Alternatively, signal paths 58 may form other known serial or parallel communications paths configured for communications in accordance with correspondingly known serial or parallel communications protocols. In any case, transmission control computer 44 is configured to control shifting between the number of automatically selectable ratios of transmission 34. In an alternative embodiment, transmission 34 may include one or more automatically selectable gear ratios, wherein automatic shifting between such one or more automatically selectable gear ratios is controlled by control computer 30.

Control computer 34 includes a number of inputs for receiving signals from various sensors or sensing systems associated with system 10. For example, system 10 includes an engine speed sensor 46 electrically connected to an engine speed input, ES, of control computer 34 via signal path 48. Engine speed sensor 46 is operable to sense the rotational speed of the engine 12 and produce an engine speed signal on signal path 48 indicative of engine rotational speed. In one embodiment, sensor 46 is a Hall effect sensor operable to determine engine speed by sensing passage thereby of a number of equi-angularly spaced teeth formed on a gear or tone wheel rotating synchronously with the crankshaft 14. Alternatively, engine speed sensor 46 may be any other known sensor operable as just described including, but not limited to, a variable reluctance sensor or the like.

System 10 further includes a vehicle speed sensor 50 electrically connected to a vehicle speed input, VS, of control computer 30 via signal path 52. Vehicle speed sensor 50 may be suitable positioned at any of a number of locations relative to the vehicle carrying engine 12, and is in any case operable to produce a vehicle speed signal corresponding to road speed of the vehicle carrying engine 12, or from which road speed of the vehicle carrying engine 12 may be readily determined. In the illustrated embodiment, for example, the vehicle speed sensor 50 is implemented as a tailshaft speed sensor suitably positioned relative to the tailshaft 36 and operable to produce a speed signal indicative of rotational speed of the tailshaft 36. The speed signal in this embodiment may be processed in a known manner to determine vehicle road speed therefrom. Alternatively, the vehicle speed sensor 50 may be implemented in the form of one or more wheel speed sensors operable to sense rotational speed of one or more of the wheels of the vehicle. In this embodiment, road speed of the vehicle corresponds directly to the output of the vehicle speed sensor 50. In any case, the vehicle speed sensor 50 may be a variable reluctance or other known speed sensor configured to produce a speed signal indicative or proportional to the road speed of the vehicle.

System 10 further includes a clutch operational status sensor 54 electrically connected to a clutch status input, CS, of control computer 30 via signal path 56. Sensor 54 may be suitable positioned relative to the clutch pedal 42 or linkage L2, and is operable to produce a clutch status signal indicative of whether the clutch 40 is engaging the engine 12 with the transmission 34 or has disengaged the engine 12 with the transmission 34. In the illustrated embodiment, sensor 54 is implemented as a switch producing a first signal, e.g., logic high signal, if the clutch pedal 42 has been depressed sufficiently to cause the clutch 40 to disengaged the engine 12 from the transmission 34, and producing a second different signal, e.g., logic low signal, if the clutch pedal 42 has not been sufficiently depressed and the clutch 40 is therefore engaging the engine 12 with the transmission 34. Alternatively, sensor 54 may be any known analog position sensor producing a corresponding analog signal indicative of the operational status of the clutch 40.

System 10 further includes an engine retarding device 60 electrically connected to an engine retarder output port, ERO, of control computer 30 via a number, M, of signal paths 62, wherein M may be any positive integer. Engine retarding device 60 is responsive to one or more control signals produced by control computer 30 on signal path 62 to produce or apply a corresponding engine retarding torque for decreasing rotational speed of the engine. In one embodiment, for example, the engine retarding device is an engine compression brake of known construction and operable to selectively control the opening and closing times of one or more cylinder exhaust valves (not shown) via control of corresponding cylinder valve actuators to resultantly apply a braking or retarding torque to the engine 12 to slow the rotational speed of the crankshaft 14. Those skilled in the art will recognize that retarding torque resulting from the operation of one or more engine accessories, or modification of engine retarding torque produced by the engine retarding device resulting from the operation of one or more engine control devices, may be controllably combined with the operation of an engine compression brake to selectively increase or decrease the resulting overall retarding torque applied to the engine 12, and any such combination is intended to be encompassed by the term "engine retarding device" used herein. Examples of such engine accessories and/or engine control devices may include, but are not limited to, one or more air compressors, alternators and/or hydraulic pumps, an air conditioning system, wastegate, exhaust throttle, variable geometry turbocharger actuator, or the like.

An engine retarder operation selector 64 is located in the cab area of the vehicle and includes a plurality of switches electrically connected to an engine retarding input port, ERI, of control computer 30 via a number, N, of signal paths, wherein N may be any positive integer. One such switch 66 is an on/off switch having an on position for activating operation of the engine retarder 60, and an off position for deactivating operation of the engine retarder 60. Additional switches are provided to allow for relative control of the level of retarding torque produced by the engine retarder 60. In the illustrated example, three such switches 68, 70 and 72 are provided to allow user control of the engine retarder 60 between a low retarding torque setting, a medium retarding torque setting and a high retarding torque setting. Alternatively, a single three-position switch may be implemented in place of the three switches 68, 70 and 72. In any case, the illustrated example corresponds to a six-cylinder engine, wherein each engine retarding torque setting, e.g., high, medium and low, corresponds to control of exhaust valve actuators for a different set of two cylinders of the engine. Thus, the low engine retarding torque setting corresponds to engine braking in two of the six cylinders, the medium engine retarding torque setting corresponds to engine braking in four of the six cylinders and the high engine retarding torque setting corresponds to engine braking in all six of the cylinders. Other exhaust value actuator control strategies may be used to separately control individual ones or other specified groups of exhaust valves, and any corresponding alternate engine retarding device control arrangements for implementing such other strategies are intended to fall within the scope of the claims appended hereto.

Figure 2:
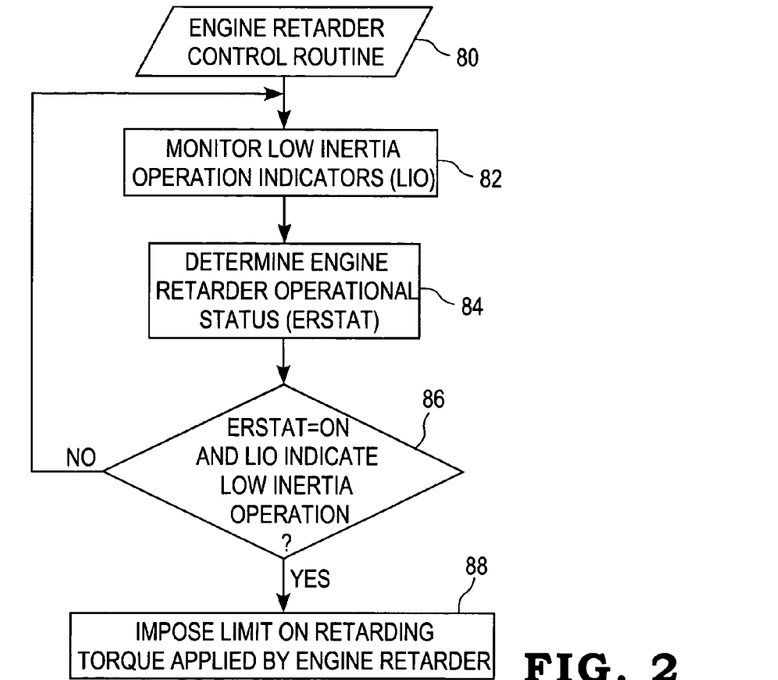
FIG. 2 is a flowchart of one illustrative embodiment of a software algorithm for controlling engine crankshaft deceleration by limiting engine retarding torque in systems of the type illustrated in FIG. 1.

Referring now to FIG. 2, a flowchart of one illustrative embodiment of a software algorithm 80 for controlling engine crankshaft deceleration by limiting engine retarding torque in systems of the type illustrated in FIG. 1 is shown. In one embodiment, algorithm 80 is stored in memory 35, and is executable by control computer 30 to control engine crankshaft deceleration. Alternatively, algorithm 80 may be stored within a memory associated with the transmission control computer 44, and executed by the transmission control computer 44, wherein information required for execution of algorithm 80 by the transmission control computer 44 may be shared with the control computer 30 via signal paths 58. For brevity, however, algorithm 80 will be described in this disclosure as being executed by control computer 30.

Execution of algorithm 80 begins at step 82 where control computer 30 is operable to monitor a number of low inertia engine operation indicators (LIO). Low inertia engine operating conditions generally occur when the output torque produced by the engine meets little or no resistance from downstream driveline components. For example, one low engine inertia operating condition occurs when the clutch 40 has disengaged the engine 12 from the transmission 34 such that an out-of-gear condition exists. Control computer 30 is operable at step 82 to monitor and detect this low engine inertia operating condition by monitoring the clutch status signal on signal path 56. If the clutch status signal indicates that the clutch 40 has disengaged the engine 12 from the transmission 34 the control computer 30 determines that a low inertia operating condition exists, and if the clutch status signal indicates that the clutch 40 is engaging the engine 12 with the transmission 34 the control computer 30 determines that a low engine inertia operating condition, if one exists, is not the result of the operation of the clutch 40. In the illustrated embodiment, the clutch status signal on signal path 56 is thus a low inertia operation indicator monitored at step 82 by control computer 30.

Another low engine inertia operating condition occurs when the effective gear ratio of the transmission 34 is above a specified gear ratio threshold, corresponding, for example, to engagement of the engine 12 with a numerically low gear of transmission 34. In such cases, torque required to drive the wheels of the vehicle is achieved through multiplication of the engine output torque by the high gear ratio of the transmission 34, and the engine 12 operates under such conditions with relatively low inertia. Control computer 82 is operable at step 82 to monitor and detect this low engine inertia operating condition by monitoring the engine speed signal produced by the engine speed sensor 46, monitoring the vehicle speed signal produced by the vehicle speed sensor (e.g., a tailshaft speed sensor) 50, and computing an effective gear ratio of the transmission 34 as a ratio of the engine speed and vehicle speed signals. Those skilled in the art will recognize that in cases where the vehicle sensor 50 is a tailshaft speed sensor as illustrated in FIG. 1, the effective gear ratio calculated by the control computer 30 will correspond directly to the ratio of engine speed and vehicle speed, whereas in cases where the vehicle speed sensor is a wheel speed or other vehicle speed sensor the effective gear ratio calculated by the control computer 30 will be proportional to the ratio of engine speed and vehicle speed and will also have to take into account effects on the gear ratio of the differential, axle, wheel diameter, and/or any rotating structure that exists between the tailshaft 36 and the vehicle speed sensor. In any case, if the computed effective gear ratio is greater than a gear ratio threshold the control computer 30 determines that a low engine inertia operating conditions exists, and if the computed effective gear ratio is otherwise less than or equal to the gear ratio threshold control computer 30 determines that a low engine inertia operating condition, if one exists, is not the result of the computed effective gear ratio exceeding the gear ratio threshold. A suitable gear ratio threshold for any particular application will typically be selected based on experimental test data, wherein the gear ratio threshold that is selected will generally correspond to an effective gear ratio above which the engine is operating below a specified or desired inertia. In the illustrated embodiment, the engine speed signal on signal path 48 and the vehicle speed signal on signal path 52 are thus two low inertia operation indicators monitored at step 82 by control computer 30. Other low engine inertia operating conditions may occur to those skilled in the art, and the monitoring of any corresponding engine operating indicators to determine or detect any such other low engine inertia operation conditions is intended to fall within the scope of the claims appended hereto.

Algorithm 80 advances from step 82 to step 84 where control computer 30 is operable to determine the operational status; i.e., whether active (enabled for operation) or not, of the engine retarding device 60 (ERSTAT). In the illustrated embodiment, control computer 30 is operable to execute step 84 by monitoring the status of the on/off switch 66 of the engine retarder control selector 64 via an appropriate one of the signal paths 74. Those skilled in the art may recognize other techniques for determining the operational status of the engine retarding device 60, and any such other techniques are intended to fall within the scope of the claims appended hereto.

Algorithm 80 advances from step 84 to 86 where control computer 30 is operable to determine whether ERSTAT is on, indicating that the engine retarding device 60 is active or enabled for operation, and whether one or more of the low inertia indicators (LIO) indicate that a low inertia operating condition exists as described hereinabove. If, at step 84, control computer 30 determines that ERSTAT is off or that ERSTAT is on but all of the low inertia indicators indicate that a low engine inertia operating condition does not exist, algorithm execution loops back to step 82. If, however, control computer 30 determines at step 84 that ERSTAT is on and at least one of the low inertia indicators indicate that a low engine inertia operating condition exists, algorithm execution advances to step 88 where control computer 30 imposes a maximum or upper retarding torque limit on the retarding torque produced or applied by the engine retarder device 60 to thereby limit the engine retarding torque produced by the engine retarding device 60.

It has been determined through experimentation that fan belt system instability conditions of the type described hereinabove in the BACKGROUND section can result from excessive engine retarding during low engine inertia operating conditions. By imposing a limit on the retarding torque produced by the engine retarding device 60 during low engine inertia operating conditions, such fan belt system instability conditions can be avoided. Algorithm 80 is thus directed to limiting the retarding torque produced by the engine retarder device 60 to control deceleration of the crankshaft 14 during low engine inertia engine operation.

Figure 3:
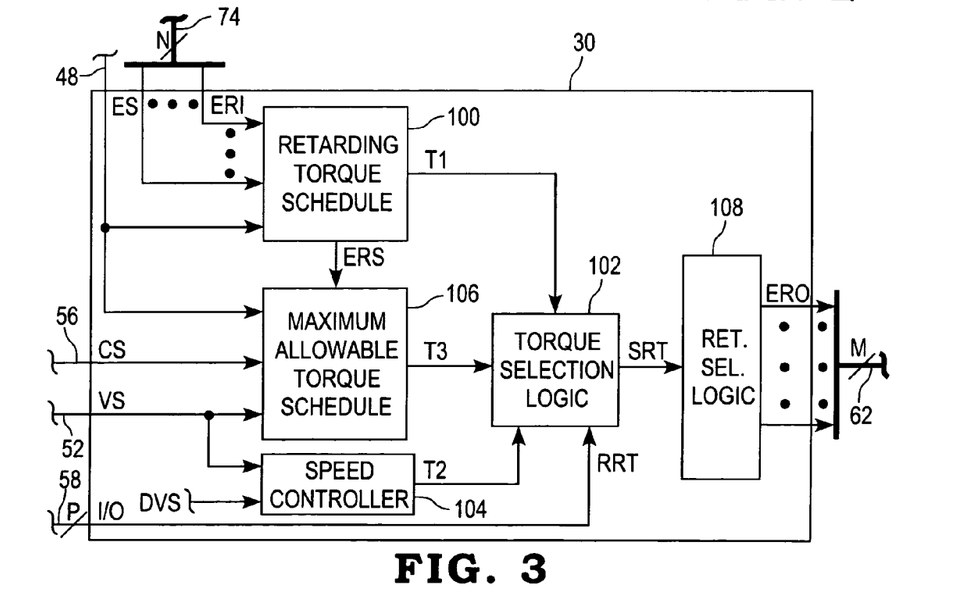
FIG. 3 is a block diagram of one illustrative implementation of the algorithm of FIG. 2 in the control computer of FIG. 1.

Referring now to FIG. 3, a block diagram of one illustrative configuration of some of the internal features of the control computer 30 of FIG. 1, as they relate to limiting the retarding torque applied by the engine retarding device 60 according to the algorithm 80 of FIG. 2, is shown. In the illustrated embodiment, an existing and known retarding torque schedule block 100 receives as inputs the engine retarding input signals from the engine retarder control selector 64 via signal paths 74 and the engine speed signal on signal path 48, and produces as outputs a first retarding torque value, T1, and an engine retarder device operational status value, ERS. The first retarding torque value, T1, is supplied to a torque selection logic block 102, and the engine retarder device operational status value output, ERS, corresponds to the operational status; i.e., activated (enabled) or not activated (disabled), of the engine retarder device 60, wherein this information was provided to block 100 via an appropriate one of the signals paths 74. Block 100 is operable, as is known in the art, to map the user-selected engine retarding torque inputs from selector 64 and current engine speed to a corresponding engine retarder torque command value for controlling the amount of retarding torque produced by the engine retarding device 60. One example implementation of block 100 is shown in FIG. 4, which shows a map of engine retarding torque vs. engine speed.

Figure 4:
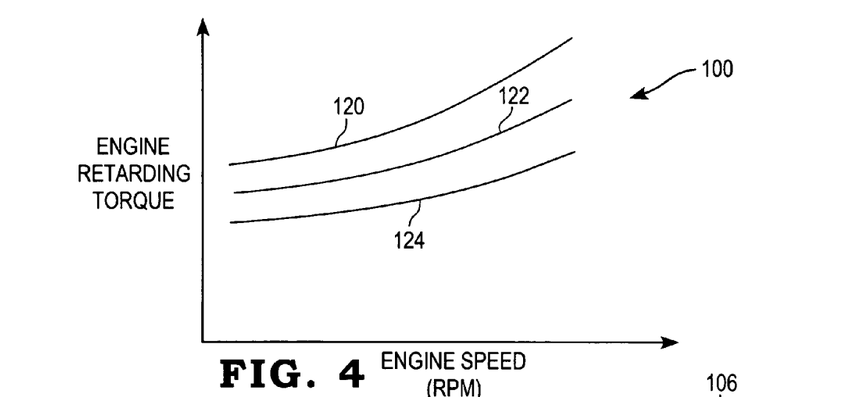
FIG. 4 is a plot of engine retarding torque vs. engine speed showing one illustrative embodiment of the retarding torque schedule block of FIG. 3.

The engine retarding torque map of FIG. 4 shows three curves, 120, 122 and 124, wherein each curve represents an engine retarding torque vs. engine speed schedule for a different engine retarding torque setting selected via the engine retarding torque control selector 64. Consistent with the example of the engine retarder control selector 64 provided hereinabove, schedule 120 corresponds to a high retarding torque request (switch 68), schedule 122 corresponds to a medium retarding torque request (switch 70) and schedule 124 corresponds to a low retarding torque request (switch 72). Within any particular engine torque schedule 120, 122 and 124, engine retarding torque generally increases with increasing engine speed. Those skilled in the art will recognize that the particular implementation of the engine retarding torque schedule 100 illustrated in FIG. 4 represents only one example of an engine retarding torque schedule, and that other engine retarding torque schedules may alternatively be implemented.

Referring again to FIG. 3, control computer 30 may further include a known speed controller block 104 having a first input receiving the vehicle speed signal on signal path 52, a second input receiving a desired vehicle speed value generated elsewhere within control computer 30 and an output producing a second retarding torque value, T2. Speed controller block 104 may be included in vehicle applications implementing a conventional cruise control system (not shown) having a cruise "set" speed, which corresponds to the desired vehicle speed value. In such systems, it is known to activate and control the engine retarder device 60 under conditions where the measured vehicle speed is or becomes sufficiently greater than the desired vehicle speed, such as may occur when the vehicle is gaining road speed by traversing a downhill grade. It will be understood that in vehicle applications having a cruise control system the control computer 30 need not include block 104, and in vehicle applications lacking a cruise control system control computer 30 generally will not include block 104, but in applications of control computer 30 including block 104, block 104 is operable to supply the retarding torque value, T2, to the torque selection logic block 102.

Control computer 30 may further receive a requested retarding torque value, RRT, from the transmission control computer 44 in embodiments of transmission 34 including the transmission control computer 44. In such embodiments, the transmission control computer 44 may request operation of the engine retarder device 60 under various conditions to control operation of the transmission 34, such as to more rapidly decrease engine speed when attempting an automatic upshift, as is known in the art. It will be understood that in applications of system 10 including a transmission control computer 44 the control computer 30 need not be configured to receive a requested retarding torque value, and in applications of system 10 lacking a transmission control computer 44 the control computer 30 generally will not be configured to receive a requested retarding torque value, but in applications wherein control computer 30 is configured to receive a requested retarding torque value, RRT, the requested retarding torque value, RRT, is supplied to the torque selection logic block 102.

In the embodiment illustrated in FIG. 3, the control computer 30 further includes a maximum allowable torque schedule block 106 receiving as inputs the engine retarder device operational status value, ERS, from block 100, the engine speed signal on signal path 48, the vehicle speed signal on signal path 52 and the clutch status signal, CS, on signal path 56. Block 106 is operable to process the foregoing inputs, in a manner consistent with algorithm 80, and produce as an output a third engine retarding torque value, T3, wherein T3 represents an upper engine retarding torque limit or maximum allowable engine retarding torque value.

In the embodiment illustrated in FIG. 3, the torque selection logic block 102 is configured to select an appropriate engine retarding torque value from the various input torque values. In embodiments of control computer 30 wherein only T1 and T3 are supplied to block 102, the torque selection logic block 102 is configured as a MIN block producing as its output a selected retarding torque value (SRT) corresponding to the minimum of T1 and T3. In this embodiment, T1 thus represents the commanded engine retarding torque or engine retarding torque command, and T3 represents the maximum retarding torque value or limit. In embodiments of control computer 30 wherein T2 is also supplied to the torque selection logic block 102, block 102 is also configured as a MIN block producing SRT as a minimum of T1, T2 and T3. In this embodiment, the minimum of T1 and T2 represent the engine retarding torque command, and T3 represents the maximum retarding torque value or limit. In embodiments of control computer 30 wherein T4 is also supplied to the torque selection logic block 102, block 102 is configured as a priority MIN block with RRT override operable to produce SRT as a minimum of T1 and T3, or of T1, T2 and T3, if a requested retarding torque value, RRT, is not received, but to produce RRT as SRT any time RRT is received. In any case, the selected retarding torque value, SRT, is supplied to a retarding torque selection logic block 108 operable to convert SRT to a number of engine retarding torque device activation signals in a known manner, wherein the engine retarding torque device activation signals are then supplied to the engine retarding torque device 60 via signal paths 62 to control the operation of individual ones or combinations of the exhaust valve actuators for each of the cylinders of the engine 12.

Figure 5:
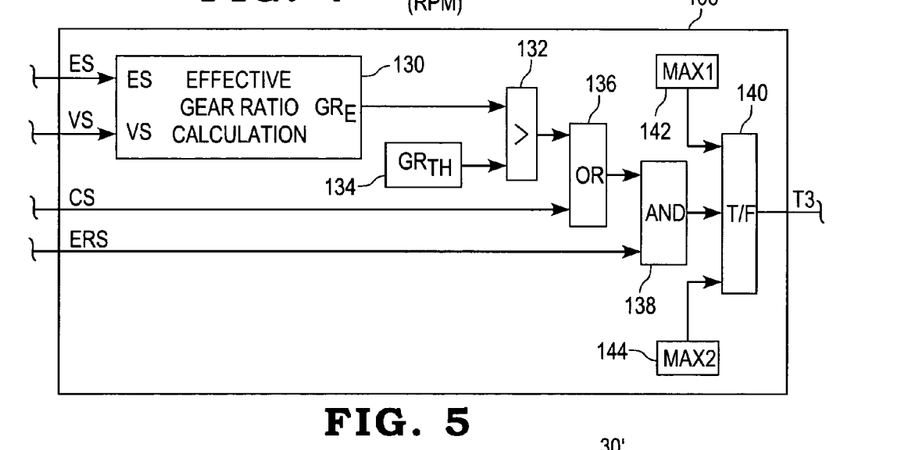
FIG. 5 is a block diagram of one illustrative embodiment of the maximum allowable torque schedule block of FIG. 3.

Referring now to FIG. 5, one illustrative embodiment of the maximum allowable torque schedule block 106 of FIG. 3 is shown. In the illustrated embodiment, block 106 includes an effective gear ratio calculation block 130 receiving as inputs the engine speed and vehicle speed signals, and producing as an output an effective gear ratio value, $GR_E$. Block 130 is operable, as described hereinabove with respect to step 82 of algorithm 80, to compute the effective gear ratio value, $GR_E$, as a ratio of engine speed and vehicle speed when the vehicle speed sensor 50 is implemented as a tailshaft speed sensor, and as proportional to the ratio of engine speed and vehicle speed when the vehicle speed sensor 50 is implemented as a wheel speed sensor or other speed sensor configured to sense rotational speed of a rotating member driven by the tailshaft 36. In any case, the effective gear ratio value, $GR_E$, is provided as one input to an arithmetic block 132 having another input receiving a threshold gear ratio value, $GR_{TH}$, stored in block 134. As described hereinabove with respect to step 82 of algorithm 80, a suitable gear ratio threshold, $GR_{TH}$, for any particular application will typically be selected based on experimental test data, wherein the gear ratio threshold that is selected will generally correspond to an effective gear ratio above which the engine is operating below a specified or desired inertia. In the illustrated embodiment, $GR_{TH}$ is a constant value stored in memory block 134, although $GR_{TH}$ may alternatively be dynamically determined as a function of one or more measured and/or estimated engine operating parameters. In any case, arithmetic block 132 is configured as a "greater than" block, so that its output is a high logic state if $GR_E$ is greater than $GR_{TH}$, and is otherwise a low logic state.

The output of arithmetic block 132 is supplied to one input of an OR block 136 having another input receiving the clutch status signal, CS. If either of the output of block 132 or CS is a high logic state, so too will be the output of the OR block 136, and the output of the OR block 136 will otherwise be a low logic state. The output of OR block 136 is supplied to one input of an AND block 138 having another input receiving the engine retarder device operational status value, ERS. If both of the output of OR block 136 and ERS are at logic high states, so too will be the output of AND block 138, and the output of AND block 138 will otherwise be a logic low state.

The output of AND block 138 is provided to the control input of a true/false block 140 having a "true" input receiving a first maximum retarding torque value, MAX1, stored in block 142, and having a "false" input receiving a second maximum retarding torque value, MAX2, stored in block 144. The output of true/false block 140 produces the maximum retarding torque value, T3, as illustrated in FIG. 3. If the output of AND block 138 is a high logic state (i.e., [($GR_E > GR_{TH}$ OR CS=disengaged) AND ERS=active or enabled], T3 is the maximum retarding torque value MAX1, and is otherwise MAX2. Selection of appropriate value for the first maximum retarding torque limit, MAX1, will generally be dictated by the application and typically based on experimental test data, wherein the maximum retarding torque limit value, MAX1, selected will generally correspond to a retarding torque value below which fan belt system instability conditions are avoided. In the illustrated embodiment, MAX1 is a constant value stored in memory block 142, although MAX1 may alternatively be dynamically determined as a function one or more measured and/or estimated engine operating parameters. The engine retarding torque value, MAX2, may be set to a retarding torque value above the maximum torque values of either T1 or T2, or may instead be set equal to T1 or T2 or some other value, and in any case is set to a torque value that ensures that T3 is not less than T1 or T2 when the relationship [($GR_E > GR_{TH}$ OR CS=disengaged) AND ERS=active or enabled] is not true.

Figure 6:
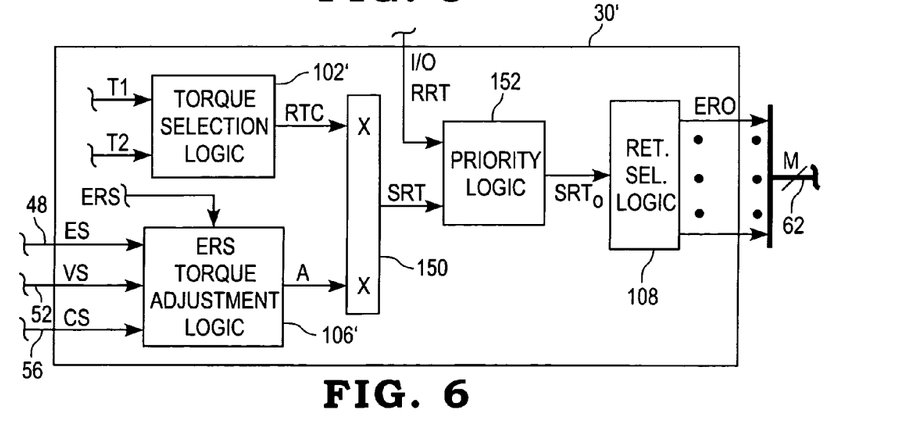
FIG. 6 is a block diagram of another illustrative implementation of the algorithm of FIG. 2 in the control computer of FIG. 1.

Referring now to FIG. 6, a block diagram of another illustrative configuration 30' of some of the internal features of the control computer 30 of FIG. 1, as they relate to limiting the retarding torque produced or applied by the engine retarder device 60 according to the algorithm 80 of FIG. 2, is shown. In the illustrated embodiment, some of the block 30' includes some of the blocks and/or retarding torque values illustrated and described with respect to FIG. 3, and while some of these blocks are not shown in FIG. 6 for brevity, like identifiers are used to identify like structures and/or values. For example, although not specifically shown in FIG. 6, block 30' includes the retarding torque schedule block 100 of FIG. 3, which is operable as described with respect to FIG. 3 to produce the retarding torque value, T1. Similarly, block 30' may include the speed controller block 104 of FIG. 3, and in embodiments of block 30' that include the speed controller block 104 it is operable as described with respect to FIG. 3 to produce the retarding torque value, T2.

In embodiments of control computer 30' including the speed controller block 104, control computer 30' also includes a modified version 102' of the torque selection logic block 102 of FIG. 3. If included in control computer 30', the torque selection logic block 102' is implemented as a MIN function, and receives as inputs the retarding torque values T1 and T2 and produces as an output a retarding torque command, RTC, corresponding to the minimum value of T1 and T2. In embodiments of control computer 30' that do not include the speed controller block 104, the torque selection logic block 102' may be omitted and the torque value, T1, produced by the retarding torque schedule block 100 becomes the retarding torque command, RTC.

The maximum allowable torque schedule block 106 of FIG. 3 is modified in the embodiment of control computer 30' illustrated in FIG. 6, and is implemented in this embodiment as a torque adjustment logic block 106'. In the illustrated embodiment, block 106' receives as inputs the engine speed and vehicle speed signals, the clutch status signal and the engine retarder device operational status value, ERS, produced by the retarding torque schedule block 100, and produces as an output a retarding torque adjustment value, A. Control computer 30' further includes an arithmetic block 150 having a first input receiving the retarding torque command, RTC, and a second input receiving the retarding torque adjustment value, A.

In the illustrated embodiment, the arithmetic block 150 is configured as a multiplication block, and in this embodiment the retarding torque adjustment value, A, is a limit value to be multiplied by RTC to thereby limit the retarding torque command, RTC, to the maximum retarding torque value. The torque adjustment logic block 106' may be implemented identically to the maximum allowable torque schedule block 106 illustrated in FIG. 5, except that the retarding torque value MAX1 is replaced by a first multiplier value, M1, and the retarding torque value MAX2 is replaced by a second multiplier value, M2. The first multiplier value, M1, is chosen such that the selected retarding torque value, SRT, produced by the arithmetic block 150 when the relationship [($GR_E$>$GR_{TH}$ OR CS=disengaged) AND ERS=active or enabled] is true is limited to the maximum retarding torque value below which fan belt system instability conditions are avoided. As with MAX1, M1 may be a constant value stored in block 142, or may instead be dynamically determined as a function of one or more measured and/or estimated engine operating parameters. The second multiplier value, M2, may be set to 1 so that block 106' has no effect on the retarding torque command, RTC, when the relationship [($GR_E$>$GR_{TH}$ OR CS=disengaged) AND ERS=active or enabled] is not true.

In an alternative embodiment, the arithmetic block 150 is configured as a summation block, and in this embodiment the retarding torque adjustment value, A, is an offset value to be added to, or subtracted from, RTC to thereby limit the retarding torque command, RTC, to the maximum retarding torque value. The torque adjustment logic block 106' in this embodiment may again be implemented identically to the maximum allowable torque schedule block 106 illustrated in FIG. 5, except that the retarding torque value MAX1 is replaced by a first add/subtract value, AS1, and the retarding torque value MAX2 is replaced by a second add/subtract value, AS2. The first add/subtract value, AS1, is chosen such that the selected retarding torque value, SRT, produced by the arithmetic block 150 when the relationship [($GR_E$>$GR_{TH}$ OR CS=disengaged) AND ERS=active or enabled] is true is limited to the maximum retarding torque value below which fan belt system instability conditions are avoided. As with M1, AS1 may be a constant value stored in block 142, or may instead be dynamically determined as a function of one or more measured and/or estimated engine operating parameters. The second add/subtract value, AS2, may be set to zero so that block 106' has no effect on the retarding torque command, RTC, when the relationship [($GR_E$>$GR_{TH}$ OR CS=disengaged) AND ERS=active or enabled] is not true.

In embodiments of system 10 wherein control computer 30' may receive a requested retarding torque, RRT, from the transmission control computer 44, control computer 30' further includes a priority logic block 152 receiving as inputs the selected retarding torque value, SRT, and the requested retarding torque, RRT, and produces as an output an overridden selected retarding torque value, $SRT_O$. $SRT_O$ is provided to retarding torque selection logic block 108 identical to block 108 illustrated and described with respect to FIG. 3. The priority logic block 152 is operable to produce the requested retarding torque, RRT, as the overridden selected retarding torque value, $SRT_O$, whenever RRT is received by control computer 30', and is otherwise operable to produce as the overridden selected retarding torque value, $SRT_O$, the selected retarding torque value, SRT.

Figure 7:
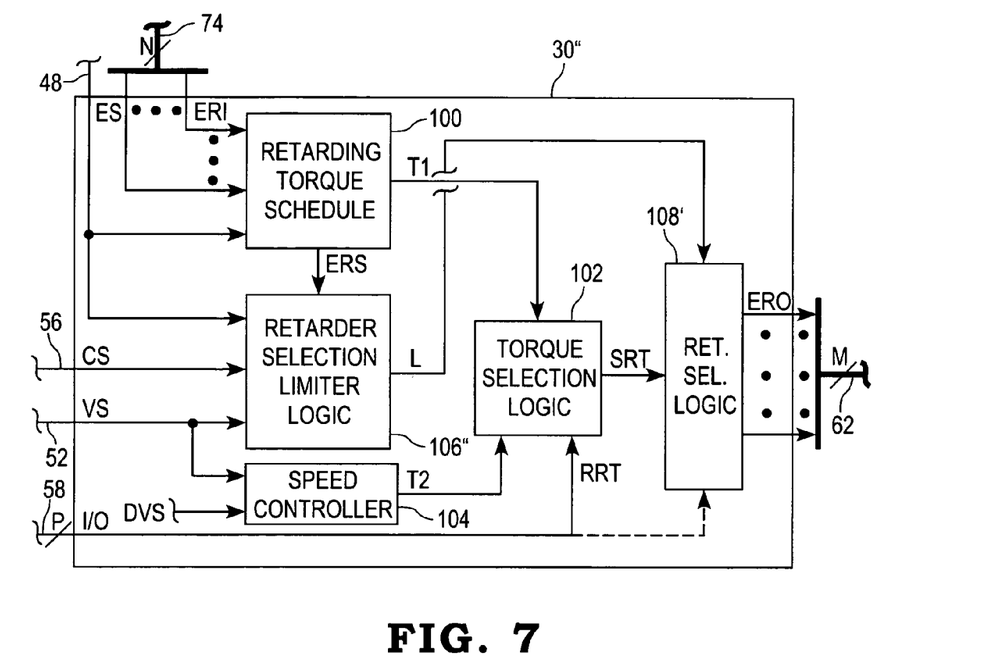
FIG. 7 is a block diagram of yet another illustrative implementation of the algorithm of FIG. 2 in the control computer of FIG. 1.

Referring now to FIG. 7, a block diagram of yet another illustrative configuration 30" of some of the internal features of the control computer 30 of FIG. 1, as they relate to limiting the retarding torque produced or applied by the engine retarder device 60 according to the algorithm 80 of FIG. 2, is shown. In the illustrated embodiment, some of the block 30" includes many of the blocks and/or retarding torque values illustrated and described with respect to FIG. 3, and like identifiers are used to identify like items. For example, block 30" includes the retarding torque schedule block 100, which is operable as described with respect to FIG. 3 to produce the retarding torque value, T1, and may include the speed controller block 104, which is operable as described with respect to FIG. 3 to produce the retarding torque value, T2. While the torque selection logic block 102 does not receive a torque value, T3, as in FIG. 3, block 102 is otherwise identical in operation to block 102 as described hereinabove with respect to FIG. 3. For example, if blocks 100 and 104 are both included in control computer 30", the torque selection logic block 102 is a MIN function and produces as the selected retarding torque value, SRT, the minimum of T1 and T2. If control computer 30" is configured to receive the requested retarding torque value, RRT, from the transmission control computer 44, block 102 is implemented as a priority MIN function producing as the selected retarding torque value, SRT, the minimum of T1 and T2 (or just T1 if block 104 is not included) whenever control computer 30" does not receive RRT, and otherwise produces RRT as SRT whenever control computer 30" receives RRT. Finally, in cases where control computer 30" does not include block 104 and is not configured to receive RRT from the transmission control computer 44, the torque selection block 102 may be omitted from control computer 30".

The maximum allowable torque schedule block 106 of FIG. 3 is modified in the embodiment of control computer 30" illustrated in FIG. 7, and is implemented in this embodiment as a retarder selection logic block 106". In the illustrated embodiment, block 106" receives as inputs the engine speed and vehicle speed signals, the clutch status signal and the engine retarder device operational status value, ERS, produced by the retarding torque schedule block 100, and produces as an output a limit number, L, which is an integer value representing the number of exhaust valve actuators to activate, corresponding to the number of engine cylinders in which engine braking will take place. Alternatively, L may be a digital code identifying not only the number of exhaust valve actuators to active, but also identifying which specific ones to activate. In either case, the output L is supplied to a retarder selection logic block 108', which is a modified version of the retarder selection logic block 108 described hereinabove with respect to FIG. 3. In the embodiment illustrated in FIG. 7, the retarder selection logic block 108' is configured as a priority-based retarder selection logic block in that regardless of the number of cylinder exhaust valve actuators that the retarder selection logic block 108' of FIG. 3 would have activated based on the selected retarding torque value, SRT, if operable as described hereinabove with respect to block 108 of FIG. 3, the retarder selection logic block 108' instead limits the number of cylinder exhaust valve actuators to be activated to L if L is less than the number of cylinder exhaust valve actuators that the retarder selection logic block 108' would have activated if operable as described with respect to block 108. By limiting the number of cylinder exhaust valve actuators that will be activated to L whenever the relationship [($GR_E$>$GR_{TH}$ OR CS=disengaged) AND ERS=active or enabled] is true, control computer 30" thus imposes a limit on the retarding torque applied or produced by the engine retarder device 60.

The retarder selection limiter logic block 106" in this embodiment may again be implemented identically to the maximum allowable torque schedule block 106 illustrated in FIG. 5, except that the retarding torque value MAX1 is replaced by a first integer or digital code value, L1, and the retarding torque value MAX2 is replaced by a second integer or digital code value, L2. The first integer or digital code value, L1, is chosen such that the "L" cylinder exhaust valve actuators that are activated when the relationship [(GR$_E$>GR$_{TH}$ OR CS=disengaged) AND ERS=active or enabled] is true limits the retarding torque produced or applied by the engine retarder device 60 to a retarding torque below which fan belt system instability conditions are avoided. As with MAX1, L1 may be a constant value stored in block 142, or may instead be dynamically determined as a function of one or more measured and/or estimated engine operating parameters. The second integer or digital code value, L2, may be set to the maximum number of cylinder exhaust valve actuators or other value that results in block 106' having no effect on the number of cylinder exhaust valve actuators activated when the relationship [(GR$_E$>GR$_{TH}$ OR CS=disengaged) AND ERS=active or enabled] is not true.

In the operation of control computer 30" as just described with respect to FIG. 7, the requested retarding torque value, RRT, if supplied by transmission control computer 44, will not override the action of block 106", and instead the action of block 106" will override RRT. In an alternative embodiment of control computer 30", as shown in phantom in FIG. 7, RRT may be supplied to the retarder torque selection logic block 108' rather than the torque selection logic block 102. In this alternative embodiment, the retarder selection logic block 108' may be modified to allow RRT to override the action of all other blocks 100, 104, 102 and 106' so that the number of cylinder exhaust valve actuators activated by block 108' corresponds to that commanded by RRT.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the illustrative embodiment described hereinabove with respect to FIG. 7 has been described hereinabove separately from the illustrative embodiments described with respect to FIG. 3 or FIG. 6, it will be understood that the various illustrative embodiments may be combined in operation so as to impose on the engine retarder device 60 both a maximum allowable torque limit and a maximum allowable number of cylinder exhaust valve actuators that may be activated. As another example, while each of the illustrative embodiments have been described herein as indefinitely imposing a limit on the retarding torque produced or applied by the engine retarding device 60 as long as the engine 12 is operating with low inertia and the engine retarder device 60 has been activated or enabled for operation, each of the illustrative embodiments may alternatively or additionally impose a limit on the amount of time that the limit on the retarding torque produced or applied by the engine retarding device 60 is imposed. Modifications to the illustrative embodiments to implement such a time limit would be a mechanical step for a skilled artisan.

What is claimed is:

1. System for controlling deceleration of an engine crankshaft in an internal combustion engine, comprising:

an engine speed sensor producing an engine speed signal indicative of rotational speed of the engine;

a vehicle speed sensor producing a vehicle speed signal indicative of road speed of a vehicle carrying the engine;

an engine retarding device configured to produce a retarding torque for decreasing rotational speed of the engine crankshaft; and a control computer configured to process the engine speed signal and the vehicle speed signal to determine an effective gear ratio of a transmission coupled to the engine and to determine that the engine is operating with low inertia if the effective gear ratio is greater than a threshold gear ratio value, the control computer further configured to control deceleration of the engine crankshaft when the engine retarding device is operational by limiting the retarding torque produced by the engine retarding device if the engine is operating with low inertia.

2. The system of claim 1 further including a tailshaft driven by the transmission;

wherein the vehicle speed sensor is a tailshaft speed sensor, and the vehicle speed signal corresponds to rotational speed of the tailshaft.

3. The system of claim 1 further including a clutch coupling the engine to the transmission and a clutch sensor producing a clutch signal indicative of an operational status of the clutch;

and wherein the control computer is configured to process the clutch signal and determine that the engine is operating with low inertia if the clutch signal indicates that the clutch has disengaged the engine from the transmission.

4. The system of claim 1 further including an engine retarding device selector having a number of user selectable switches, one of the number of user selectable switches corresponding to an on/off switch having an on position for activating the engine retarding device and an off position for deactivating the engine retarding device, and at least another of the number of user selectable switches corresponding to a retarding level selector for selecting a relative level of engine retarding torque to be produced by the engine retarding device;

wherein the control computer is configured to determine that the engine retarding device is operational if the on/off switch is in the on position.

5. The system of claim 4 wherein the control computer includes:

a retarding torque schedule responsive to the engine speed signal and to outputs of the number of user selectable switches to produce an engine retarding torque command, and to produce an engine retarding device active value if the on/off switch is in the on position;

a maximum allowable retarding torque schedule responsive to the engine speed signal, the vehicle speed signal and the engine retarding device active value to produce a maximum retarding torque value;

torque selection logic producing a selected retarding torque value as a minimum of the engine retarding torque command and the maximum retarding torque value; and retarding device selection logic controlling operation of the engine retarding device based on the selected retarding torque value.

6. The system of claim 5 wherein the transmission includes a number of automatically selectable gear ratios and a transmission control computer configured to control shifting between the automatically selectable gear ratios, the transmission control computer producing a retarding torque request under specified transmission operating conditions;

and wherein the torque selection logic is configured to produce the retarding torque request as the selected torque value if the retarding torque request is produced by the transmission control computer, and to otherwise produce as the selected torque value the minimum of the engine retarding torque command and the maximum retarding torque value.

7. The system of claim 4 wherein the control computer includes:
   a retarding torque schedule responsive to the engine speed signal and to outputs of the number of user selectable switches to produce a first retarding torque value, and to produce an engine retarding device active value if the on/off switch is in the on position;
   a speed controller responsive to the vehicle speed signal and a desired vehicle speed value to produce a second retarding torque value;
   a maximum allowable retarding torque schedule responsive to the engine speed signal, the vehicle speed signal and the engine retarding device active value to produce a third retarding torque value corresponding to a maximum retarding torque value;
   torque selection logic determining an engine retarding torque command based on the first and second torque values, and producing a selected retarding torque value as a minimum of the engine retarding torque command and the maximum retarding torque value; and
   retarding device selection logic controlling operation of the engine retarding device based on the selected retarding torque value.

8. The system of claim 7 wherein the transmission includes a number of automatically selectable gear ratios and a transmission control computer configured to control shifting between the automatically selectable gear ratios, the transmission control computer producing a retarding torque request under specified transmission operating conditions;
   and wherein the torque selection logic is configured to produce the retarding torque request as the selected torque value if the retarding torque request is produced by the transmission control computer, and to otherwise produce as the selected torque value the minimum of the engine retarding torque command and the maximum retarding torque value.

9. The system of claim 4 wherein the control computer includes:
   a retarding torque schedule responsive to the engine speed signal and to outputs of the number of user selectable switches to produce an engine retarding torque command, and to produce an engine retarding device active value if the on/off switch is in the on position;
   torque adjustment logic responsive to the engine speed signal, the vehicle speed signal and the engine retarding device active value to produce a torque adjustment value;
   arithmetic logic responsive to the engine retarding torque command and the torque adjustment value to produce a selected retarding torque value that limits the engine retarding torque command to a maximum retarding torque value; and
   retarding device selection logic controlling operation of the engine retarding device based on the selected retarding torque value.

10. The system of claim 9 wherein the transmission includes a number of automatically selectable gear ratios and a transmission control computer configured to control shifting between the automatically selectable gear ratios, the transmission control computer producing a retarding torque request under specified transmission operating conditions;
   and wherein the control computer further includes priority logic configured to produce the retarding torque request as the selected torque value if the retarding torque request is produced by the transmission control computer, and to otherwise produce as the selected torque value the minimum of the engine retarding torque command and the maximum retarding torque value.

11. The system of claim 4 wherein the control computer includes:
   a retarding torque schedule responsive to the engine speed signal and to outputs of the number of user selectable switches to produce a first retarding torque value, and to produce an engine retarding device active value if the on/off switch is in the on position;
   a speed controller responsive to the vehicle speed signal and a desired vehicle speed value to produce a second retarding torque value;
   torque selection logic responsive to the first and second torque values to produce an engine retarding torque command;
   torque adjustment logic responsive to the engine speed signal, the vehicle speed signal and the engine retarding device active value to produce a torque adjustment value;
   arithmetic logic responsive to the engine retarding torque command and the torque adjustment value to produce a selected retarding torque value that limits the engine retarding torque command to a maximum retarding torque value; and
   retarding device selection logic controlling operation of the engine retarding device based on the selected retarding torque value.

12. The system of claim 11 wherein the transmission includes a number of automatically selectable gear ratios and a transmission control computer configured to control shifting between the automatically selectable gear ratios, the transmission control computer producing a retarding torque request under specified transmission operating conditions;
   and wherein the control computer further includes priority logic configured to produce the retarding torque request as the selected torque value if the retarding torque request is produced by the transmission control computer, and to otherwise produce as the selected torque value the minimum of the engine retarding torque command and the maximum retarding torque value.

13. The system of claim 4 wherein the engine retarding device includes a total number of actuators each configured to control operation of a different cylinder exhaust valve of the engine;
   and wherein control computer includes:
   a retarding torque schedule responsive to the engine speed signal and to outputs of the number of user selectable switches to produce an engine retarding torque command, and to produce an engine retarding device active value if the on/off switch is in the on position;
   retarder selection limiter logic responsive to the engine speed signal, the vehicle speed signal and the engine retarding device active value to produce a limit value; and
   retarder selection logic controlling operation of the total number of actuators, the retarder selection logic determining a first number of the total number of actuators to activate based on the engine retarding torque command, the retarder selection logic activating the first number of the total number of actuators if the first number is less than or equal to the limit value and otherwise activating a number of the total number of actuators corresponding to the limit value.

14. The system of claim 13 wherein the transmission includes a number of automatically selectable gear ratios and a transmission control computer configured to control shifting between the automatically selectable gear ratios, the transmission control computer producing a retarding torque request under specified transmission operating conditions;

and wherein the retarder selection logic is configured to activate the first number of the total number of actuators if the first number is less than or equal to the limit value and otherwise activate a number of the total number of actuators corresponding to the limit value only if the retarding torque request is not produced by the transmission control computer, and to otherwise determine a second number of the total number of actuators based on the retarding torque request and activate the second number of the total number of actuators.

15. The system of claim 4 wherein the transmission includes a number of automatically selectable gear ratios and a transmission control computer configured to control shifting between the automatically selectable gear ratios, the transmission control computer producing a retarding torque request under specified transmission operating conditions;

and wherein the engine retarding device includes a total number of actuators each configured to control operation of a different cylinder exhaust valve of the engine;

and wherein control computer includes:

a retarding torque schedule responsive to the engine speed signal and to outputs of the number of user selectable switches to produce an engine retarding torque command, and to produce an engine retarding device active value if the on/off switch is in the on position;

torque selection logic producing a selected retarding torque value, the selected retarding torque value corresponding to the retarding torque request if the retarding torque request is produced by the transmission control computer and otherwise corresponding to the engine retarding torque command;

retarder selection limiter logic responsive to the engine speed signal, the vehicle speed signal and the engine retarding device active value to produce a limit value; and retarder selection logic controlling operation of the total number of actuators, the retarder selection logic determining a first number of the total number of actuators to activate based on the selected retarding torque value, the retarder selection logic activating the first number of the total number of actuators if the first number is less than or equal to the limit value and otherwise activating a number of the total number of actuators corresponding to the limit value.

16. The system of claim 4 wherein the engine retarding device includes a total number of actuators each configured to control operation of a different cylinder exhaust valve of the engine;

and wherein control computer includes:

a retarding torque schedule responsive to the engine speed signal and to outputs of the number of user selectable switches to produce a first retarding torque value, and to produce an engine retarding device active value if the on/off switch is in the on position;

a speed controller responsive to the vehicle speed signal and a desired vehicle speed value to produce a second retarding torque value;

torque selection logic producing a selected retarding torque value corresponding to a minimum of the first and second retarding torque values;

retarder selection limiter logic responsive to the engine speed signal, the vehicle speed signal and the engine retarding device active value to produce a limit value; and retarder selection logic controlling operation of the total number of actuators, the retarder selection logic determining a first number of the total number of actuators to activate based on the selected retarding torque value, the retarder selection logic activating the first number of the total number of actuators if the first number is less than or equal to the limit value and otherwise activating a number of the total number of actuators corresponding to the limit value.

17. The system of claim 16 wherein the transmission includes a number of automatically selectable gear ratios and a transmission control computer configured to control shifting between the automatically selectable gear ratios, the transmission control computer producing a retarding torque request under specified transmission operating conditions;

and wherein the torque selection logic is configured to produce the retarding torque request as the selected torque value if the retarding torque request is produced by the transmission control computer, and to otherwise produce as the selected torque value the minimum of the first and second torque values.

18. The system of claim 1 wherein the engine retarding device is an engine compression brake.

19. A method for controlling engine crankshaft deceleration in an internal combustion engine, the method comprising the steps of:

monitoring an engine speed signal produced by an engine speed sensor operable to sense rotational speed of the engine;

monitoring a vehicle speed signal produced by a vehicle speed sensor operable to sense road speed of a vehicle carrying the engine;

computing an effective gear ratio as a function of the engine speed signal and the vehicle speed signal;

determining that the engine is operating with low inertia if the effective gear ratio is greater than a threshold gear ratio;

monitoring an operational status of an engine retarding device configured to produce a retarding torque for decreasing rotational speed of the engine crankshaft; and limiting the retarding torque produced by the engine retarding device if the engine retarding device is operational and if the engine is operating with low inertia.

20. The method of claim 19 further including:

monitoring a clutch signal produced by a clutch sensor operable to sense an operational status of a clutch coupling the engine to a transmission; and determining that the engine is operating with low inertia if the clutch signal indicates that the clutch has disengaged the engine from the transmission.

* * * * *